US012480636B2

(12) United States Patent
Wu

(10) Patent No.: US 12,480,636 B2
(45) Date of Patent: Nov. 25, 2025

(54) DYNAMIC DISPLAY APPARATUS

(71) Applicant: Guangdong Xin Qian Chao Information Technology Co., Ltd., Shenzhen (CN)

(72) Inventor: Jifeng Wu, Shenzhen (CN)

(73) Assignee: Guangdong Xin Qian Chao Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/606,846

(22) Filed: Mar. 15, 2024

(65) Prior Publication Data

US 2024/0310022 A1 Sep. 19, 2024

(30) Foreign Application Priority Data

Mar. 15, 2023 (CN) ........................ 202310270827.3

(51) Int. Cl.

| | |
|---|---|
| ***F21V 3/00*** | (2015.01) |
| ***F21S 10/06*** | (2006.01) |
| ***F21V 7/04*** | (2006.01) |
| ***F21V 19/00*** | (2006.01) |
| ***F21V 23/00*** | (2015.01) |
| ***F21W 121/00*** | (2006.01) |

(Continued)

(52) U.S. Cl.

CPC ................ *F21V 3/00* (2013.01); *F21S 10/06* (2013.01); *F21V 7/04* (2013.01); *F21V 19/0015* (2013.01); *F21V 23/003* (2013.01); *F21W 2121/00* (2013.01); *F21Y 2107/30* (2016.08); *F21Y 2113/13* (2016.08); *F21Y 2115/10* (2016.08)

(58) Field of Classification Search

CPC ........... F21S 10/06; F21S 10/043; F21V 3/00; F21V 7/04; F21V 19/0015; F21V 23/003; F21V 2113/13; F21Y 2115/10; F21Y 2107/30; F21Y 2113/13; F21W 2121/00

See application file for complete search history.

(56) References Cited

U.S. PATENT DOCUMENTS 12,123,584 B2 * 10/2024 Colquhoun .............. A63H 3/28
2002/0097577 A1 * 7/2002 Huang ................ F21V 21/0824
362/240

(Continued)

FOREIGN PATENT DOCUMENTS

CN 2577368 Y * 10/2003
CN 110806687 A * 2/2020
CN 111556602 A * 8/2020 ............. H05B 45/10

*Primary Examiner* — Erin Kryukova

(74) *Attorney, Agent, or Firm* — PATTAO LLC; Junjie Feng

(57) ABSTRACT

A dynamic display apparatus is provided, including a simulation unit and a control unit. The simulation unit comprises a plurality of light-emitting elements (e.g. light-emitting diode beads) that are spatially arranged on a platform (e.g. flexible circuit board) to form one or more simulated moving tracks of one or more objects to be simulated. The control unit is communicatively coupled to the light-emitting elements, and controls an ON/OFF state, an ON/OFF frequency, an ON/OFF duration, and/or a light intensity of each light-emitting element such that lights emitted therefrom compositely mimic at least one motion state of the objects. The dynamic display apparatus can be used to mimically display complex effects, such as the flying and flashing effects of fireflies.

16 Claims, 6 Drawing Sheets

(51) Int. Cl.

| | |
|---|---|
| ***F21Y 107/30*** | (2016.01) |
| ***F21Y 113/13*** | (2016.01) |
| ***F21Y 115/10*** | (2016.01) |

(56) References Cited

U.S. PATENT DOCUMENTS

| | | | | |
|---|---|---|---|---|
| 2003/0137841 | A1* | 7/2003 | Wu | F21S 4/10<br>40/550 |
| 2005/0057941 | A1* | 3/2005 | Pederson | F21S 10/06<br>362/542 |
| 2008/0238345 | A1* | 10/2008 | Jaan | F21S 9/037<br>315/312 |
| 2010/0202139 | A1* | 8/2010 | Lynn | F21S 10/06<br>362/249.02 |
| 2018/0238500 | A1* | 8/2018 | Ramaiah | F21K 9/232 |
| 2024/0114607 | A1* | 4/2024 | Li | F21S 9/035 |

* cited by examiner

DYNAMIC DISPLAY APPARATUS

CROSS-REFERENCE TO RELATED APPLICATION

The present application claims priority to Chinese Patent Application No. 202310270827.3 filed on Mar. 15, 2023, whose disclosure is hereby incorporated by reference in its entirety.

TECHNICAL FIELD

The present disclosure relates generally to the field of display and lighting technologies, and in particular to a dynamic display apparatus that is capable of mimically displaying the motion states of one or more objects, such as the flying state and/or the stationary state of fireflies.

BACKGROUND

Existing motion simulating lamps typically include atmosphere lamps, camping lamps, courtyard lamps, etc., which typically can only exhibit ordinary flashing effects, and usually have dull colors, simple shapes and cumbersome structures, and they are typically unable to truly simulate complex effects.

SUMMARY

In this present disclosure, a dynamic display apparatus is provided, which is capable of mimically displaying complex effects such as the flying and flashing effects of fireflies.

The dynamic display apparatus contains a simulation unit and a control unit. The simulation unit comprises a platform and a plurality of light-emitting elements, and the plurality of light-emitting elements are spatially arranged on the platform to thereby form one or more simulated moving tracks of one or more objects to be simulated or mimicked. The control unit is communicatively coupled to the plurality of light-emitting elements, and controls at least one of an ON/OFF state, an ON/OFF frequency, an ON/OFF duration, or a light intensity of each of the plurality of light-emitting elements such that lights emitted therefrom compositely mimic at least one motion state of the one or more objects.

According to some embodiments of the dynamic display apparatus, the at least one motion state comprises a moving state, and as such, the control unit is configured to be able to control a subset of the plurality of light-emitting elements corresponding to one of the one or more simulated moving tracks according to a control logic, such that lights emitted therefrom compositely mimic the moving state of one of the one or more objects moving on the one of the one or more simulated moving tracks.

Herein optionally, the control logic controls a sequence (i.e. order), a frequency, or a duration (i.e. lasting time) of an ON state of each of the subset of the plurality of light-emitting elements, and/or controls a distance between two neighboring light-emitting elements that are at an ON state, so as to realize the control of a speed and/or a manner of the one of the one or more objects moving on the one of the one or more simulated moving tracks.

Herein the sequence can optionally include (1) a sequential order, in which the lights emitted from the subset of the plurality of light-emitting elements compositely mimic the one of the one or more objects moving in a direction along the one of the one or more simulated moving tracks; and/or optionally include (2) a back-and-forth order, in which the lights emitted from the subset of the plurality of light-emitting elements compositely mimic the one of the one or more objects oscillatingly moving along the one of the one or more simulated moving tracks.

According to some embodiments of the dynamic display apparatus, the at least one motion state comprises a stationary state (i.e. not moving), and as such, the control unit is configured to be able to control one or more of the plurality of light-emitting elements, such that lights emitted therefrom mimically display a constantly lighting effect, and/or an in situ flashing effect of each of a subset of the one or more objects.

In certain embodiments of the dynamic display apparatus, the platform comprises a tubular platform (i.e. a platform with a tubular shape such as a circle, an oval, or a polygon), and the plurality of the light-emitting elements are mounted on part or all of an outer surface of the platform with a light-emission direction thereof outward to a surrounding environment.

In the above embodiments of the dynamic display apparatus (i.e. those containing a tubular platform), the dynamic display apparatus can further contain a first shade, which is arranged over the plurality of the light-emitting elements along a light emission direction thereof and configured to modulate lights emitted therefrom. Herein optionally, the first shade is configured to be light-transmissible and opaque, and as such, the first shade may optionally have a transparent composition (e.g. polycarbonate or glass) doped with a light diffusing agent (i.e. titanium dioxide).

According to some embodiments, the various parameters of the dynamic display apparatus can be configured so as to realize a certain specific effect. For example, at least one of the following three parameters, including (1) sizes of the plurality of light-emitting elements; (2) a scattering degree of the first shade; or (3) a distance between the plurality of the light-emitting elements and the first shade can be adjusted so as to realize that the one or more objects to be mimicked have a prescribed size. According to some embodiments, the adjustment of one or more of these three parameters can be carried out by means of the control unit.

According to some embodiments, lights emitted by each light-emitting element form on the first shade a luminous spot that comprises a central part and a peripheral part, and the first shade is configured such that the central part and the peripheral part have a reduced difference in brightness.

Herein, according to some embodiments of the dynamic display apparatus, the control unit is configured to be able to control the sizes of the one or more objects to be mimicked by controlling at least one of: (1) sizes of the plurality of light-emitting elements; (2) a scattering degree of the first shade; or (3) a distance between the plurality of the light-emitting elements and the first shade.

Herein, according to some embodiments, the dynamic display apparatus can further include one or two first lighting units, each configured to provide lighting from one end of the tubular platform of the simulation unit to the surrounding environment. Herein, each first lighting unit can include a reflective cup, a first lighting lamp, and a reflective plate. The reflective cup is arranged over the one end of the tubular platform with an opening thereof facing outwards away from the one end of the tubular platform; the first lighting lamp is arranged at a bottom of the reflective cup; and the reflective plate is arranged over the reflective cup on a side thereof that is distal from the tubular platform, with a reflective surface thereof optically facing the opening of the reflective cup. The first lighting unit is configured such that lights emitted from the first lighting lamp are able to, upon reaching the reflective surface of the reflective plate, get reflected outward to the surrounding environment. Herein optionally, the reflective surface of the reflective plate has a convex shape facing the opening of the reflective cup, and further optionally, the reflective surface of the reflective plate is configured to diffusingly reflect the lights emitted from the first lighting lamp.

Herein, according to some embodiments, the dynamic display apparatus can further include one or two second lighting units, each configured to provide lighting from one end of the tubular platform to the surrounding environment. Herein, each second lighting unit can include a second lighting lamp and a light diffuser. The second lighting lamp includes a plurality of lighting beads arranged in a ring surrounding the tubular platform; and the light diffuser is arranged over the second light lamp and surrounding the tubular platform, and is configured to diffusingly transmit lights emitted from the plurality of lighting beads of the second lighting lamp to thereby provide diffused lights to the surrounding environment. Herein optionally, the dynamic display apparatus further contains a first shade, which is arranged over the plurality of the light-emitting elements along a light emission direction thereof and configured to modulate lights emitted therefrom, and an outer surface of the first shade is configured to be reflective such that the diffused lights emitted from the second lighting units can be reflected by the outer surface of the first shade outward to the surrounding environment. Further optionally, the dynamic display apparatus can further include a second shade surrounding the first shade, and the second lighting lamp and the light diffuser of the second lighting unit can be arranged between the first shade and the second shade.

In any embodiments of the dynamic display apparatus as described above, each of the plurality of the light-emitting elements can be a light-emitting diode (LED) bead, and the platform can include a flexible circuit board, and the plurality of the light-emitting elements are electrically mounted onto the flexible circuit board.

According to some embodiments of the dynamic display apparatus, each of the plurality of light-emitting elements may contain at least two of a red light-emitting sub-element, a green light-emitting sub-element, or a blue light-emitting sub-element, and the control unit is further configured to be able to control a color scheme of each of the plurality of light-emitting elements. Herein the color scheme includes at least two of a red light, a green light, or a blue light, or a combination thereof.

According to some embodiments of the dynamic display apparatus, the one or more objects may contain at least one firefly, and as such, the at least one motion state may include a flying state and/or a stationary state of the at least one firefly, and the plurality of light-emitting elements are spatially arranged to thereby form one or more simulated flying tracks of the at least one firefly.

According to some other embodiments of the dynamic display apparatus, the one or more objects comprise a plurality of microscopic particles (or ideal gas molecules), the at least one motion state comprises a Brownian movement of the plurality of microscopic particles, and the plurality of light-emitting elements are spatially arranged to thereby form a plurality of simulated moving tracks of the plurality of microscopic particles.

According to some embodiments, the dynamic display apparatus can further contain a sensor that is communicatively connected to the control unit and is configured to detect a command from a user by sensing any one of touching, shaking, or moving of the apparatus by the user. As such, the control unit is configured, upon detecting the command, to control a change of motion state mimicked by the simulation unit. Herein the sensor can be any one of an accelerometer, a gyroscopic sensor, a tactile sensor, a capacitive sensor, a piezoelectric sensor, or a combination thereof.

According to some embodiments, the dynamic display apparatus can further contain an antenna that is communicatively connected to the control unit and wirelessly coupled to a user terminal device. Herein, upon the antenna receiving an instruction from the user terminal device, the control unit is configured to control a change of motion state mimicked by the simulation unit.

According to some embodiments, the dynamic display apparatus can further contain a power source that is configured to provide power to the simulation unit and to the control unit. Herein optionally, the power source may comprise a battery, wherein the battery comprises a high-capacity battery, or a rechargeable battery.

In some embodiments, the power source may comprise a high-capacity battery, which can be at least one of a lithium battery, a lithium ion battery, or a hydrogen fuel cell.

In some other embodiments, the power source may comprise a rechargeable battery, and the dynamic display apparatus further comprises at least one of: (1) a first interface, which is electrically connected to the rechargeable battery and configured to allow the rechargeable battery to be recharged by electrically connecting an outside power outlet to the first interface; or (2) a solar panel, which is electrically connected to the rechargeable battery and configured to recharge the rechargeable battery using solar energy. Further optionally, a second interface that is electrically connected to the power source is further included in the dynamic display apparatus, and the second interface is configured to power another electronic device thereby.

DETAILED DESCRIPTION

Figure 1:
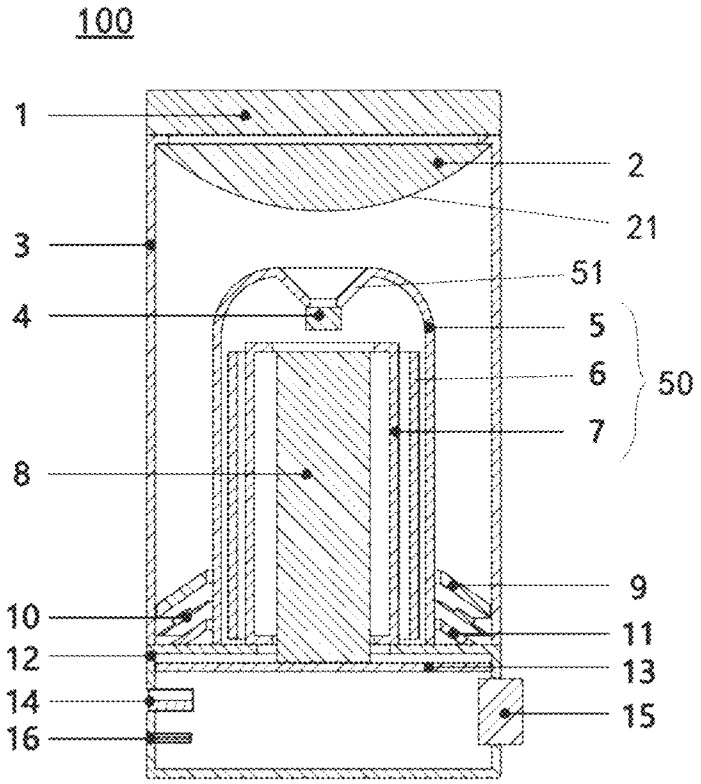
FIG. 1 shows a schematic structure of one embodiment of the dynamic display apparatus according to some embodiments of the present disclosure.

Detailed description of the inventions in this present disclosure will be provided in great detail below with reference to the accompanying drawings.

In this present disclosure, a dynamic display apparatus is provided, which is capable of displaying complex effects, and in particular is capable of mimically displaying the various motion states (i.e., moving states or stationary states) of a population of dotted objects, such as the flying and flashing effects of fireflies. In addition, the dynamic display apparatus can optionally be provided with a lighting functionality.

Herein, "a population dotted objects" can be a population of objects that have small sizes and are usually independent from each other in the population. In particular, a population of dotted objects can be a population of fireflies having motion states such as flying, maintaining stationary (not moving), and flashing, etc. Other examples for dotted objects can include, but are not limited to, living organisms, such as honeybees, butterflies, or paramecia, etc., and can also include non-living objects such as microscopic particles capable of having a Brownian movement.

The dynamic display apparatus as provided herein can be used as an atmosphere lamp, a camping lamp, a courtyard lamp, etc., and the lamp can also be used for lighting as an indoor lamp, or used for lighting applied to various different application scenarios. According to one particular embodiment, the dynamic display apparatus is capable of mimically displaying the various motion states, such as the flying state, stationary state, or flashing state, of fireflies. According to another embodiment, the dynamic display apparatus is capable of mimically displaying the Brownie movement of a population of microscopic particles. It is to be noted that these are just specific embodiments, and shall not impose any limitation to the scope of the disclosure.

In a first aspect, the present provides a dynamic display apparatus, which comprises a simulation unit and a control unit.

The simulation unit comprises a platform and a plurality of light-emitting elements, and the plurality of light-emitting elements are spatially arranged on the platform to thereby form one or more simulated moving tracks of one or more objects to be simulated. The control unit is communicatively coupled to the plurality of light-emitting elements, and is configured to control an ON/OFF state, an ON/OFF frequency, an ON/OFF duration, and/or a light intensity of each of the plurality of light-emitting elements such that lights emitted therefrom together or compositely mimic at least one motion state of the one or more objects.

Herein the plurality of the light-emitting elements can be a plurality of light-emitting diode (LED) beads (e.g. surface mounted device (SMD) LEDs), but can also be other dotted lighting components (e.g. light bulbs, neo lights, etc.). The platform substantially provides a mounting and wiring means on which the plurality of the light-emitting elements are mounted and electrically wired. Optionally the platform can comprise a printed circuit board (PCB), and in particular can comprise a flexible circuit board (FCB), and the latter allows the platform to take any flexible shape. In one particular embodiment, the platform can be of a tubular shape, i.e., the platform forms a cylinder with an intersection being a circle, an oval, a polygon, etc. Yet it should be mentioned that the platform in the dynamic display apparatus as provided herein can take a rigid composition (e.g. PCB) and/or can take other shapes (e.g. a flat shape) as well, and even PCB can be assembled together to take a tubular shape or other shapes.

According to one specific embodiment which will be described in greater detail in Example 1 below, each of the plurality of the light-emitting elements is a light-emitting diode (LED) bead, and the platform comprises a flexible circuit board (FCB) that takes a tubular shape. The plurality of LED beads are mounted and properly wired onto the flexible circuit board to thereby form one or more simulated moving tracks of one or more objects to be simulated.

Herein according to some embodiments, each of the one or more objects to be simulated is substantially a dotted object, and the at least one motion state can include a moving state and/or a stationary state (which can be keeping still, or can be flashing in situ). According to one specific embodiment provided in Example 1, the objects to be simulated include fireflies, and the at least one motion state of fireflies to be mimicked include flying, keeping still, and/or flashing of these fireflies. According to other embodiments, the objects to be simulated can also include other living organisms such as honeybees, butterflies, or paramecia, etc., or can include non-living objects such as microscopic particles capable of having a Brownian movement.

According to some embodiments of the dynamic display apparatus, the at least one motion state comprises a moving state, and as such, the control unit is configured to be able to control a subset of the plurality of light-emitting elements corresponding to one of the one or more simulated moving tracks according to a control logic, such that lights emitted therefrom compositely mimic the moving state of one of the one or more objects moving on the one of the one or more simulated moving tracks.

Herein optionally, the control logic controls a sequence (i.e. order), a frequency, or a duration (i.e. lasting time) of an ON state of each of the subset of the plurality of light-emitting elements, and/or controls a distance between two neighboring light-emitting elements that are at an ON state, so as to realize the control of a speed and/or a manner of the one of the one or more objects moving on the one of the one or more simulated moving tracks.

Herein the sequence or order can optionally include (1) a sequential order, in which the lights that are sequentially emitted from the subset of the plurality of light-emitting elements compositely mimic the one of the one or more objects moving in a direction along the one of the one or more simulated moving tracks; and/or optionally include (2) a back-and-forth order, in which the lights emitted from the subset of the plurality of light-emitting elements compositely mimic the one of the one or more objects oscillatingly moving along the one of the one or more simulated moving tracks.

According to some embodiments of the dynamic display apparatus, the at least one motion state comprises a stationary state, and as such, the control unit is configured to be able to control one or more of the plurality of light-emitting elements, such that lights emitted therefrom mimically display at least one of a constantly lighting effect or an in situ flashing effect of each of a subset of the one or more objects.

According to some embodiments of the dynamic display apparatus, the control unit is configured to be able to control the sizes of the one or more objects to be mimicked by controlling at least one of: (1) sizes of the plurality of light-emitting elements (e.g. by means of a controllable shutter to adjust the aperture of the lights emitted from the light-emitting elements); (2) a scattering degree of the first shade (e.g. by means of liquid crystals or polarizer that can electrically module the scattering feature of the first shade); or (3) a distance between the plurality of the light-emitting elements and the first shade (i.e., by arranging one or both of the platform and the first shade such that the distance therebetween can be adjustable, e.g. by means of a motor coupled thereto).

According to some embodiments of the dynamic display apparatus, each of the plurality of light-emitting elements may contain at least two of a red light-emitting sub-element, a green light-emitting sub-element, or a blue light-emitting sub-element, and the control unit is further configured to be able to control a color scheme of each of the plurality of light-emitting elements. Herein the color scheme includes at least two of a red light, a green light, or a blue light, or a combination thereof.

In certain embodiments of the dynamic display apparatus, the platform comprises a tubular platform, and the plurality of the light-emitting elements are mounted on part or all of an outer surface of the platform with a light-emission direction thereof outward to a surrounding environment.

In some embodiments of the dynamic display apparatus, the dynamic display apparatus can further contain a first shade, which is arranged over the plurality of the light-emitting elements along a light emission direction thereof and configured to modulate lights emitted therefrom. Herein optionally, the first shade is configured to be light-transmissible and opaque, and as such, the first shade may optionally have a transparent composition (e.g. polycarbonate or glass) doped with a light diffusing agent (e.g. titanium dioxide).

In order to allow the luminous spot formed on the first shade (formed by the lights emitted from each light-emitting element) to better simulate the object to be mimicked, various parameters of the dynamic display apparatus can be adjusted. For example, at least one of the following three parameters, including (1) sizes of the plurality of light-emitting elements (e.g. by employing LED beads of an appropriate size, or by employing a controlled shutter); (2) a scattering degree of the first shade (e.g. by altering the composition and proportion of the light diffusing agent, or by employing LCD in the first shade); and (3) a distance between the plurality of the light-emitting elements and the first shade (e.g. by arranging that they have an appropriate distance or by employing a motor), can be adjusted so as to realize that the one or more objects to be mimicked have a prescribed size (e.g. the size of a firefly).

According to some embodiments, lights emitted by each light-emitting element form on the first shade a luminous spot that comprises a central part and a peripheral part, and the first shade is configured such that the central part and the peripheral part have a reduced difference in brightness.

According to some embodiments, the dynamic display apparatus can further include one or two first lighting units, each configured to provide lighting from one end of the tubular platform of the simulation unit to the surrounding environment. Herein, each first lighting unit can include a reflective cup, a first lighting lamp, and a reflective plate. The reflective cup is arranged over the one end of the tubular platform with an opening thereof facing outwards away from the one end of the tubular platform; the first lighting lamp is arranged at a bottom of the reflective cup; and the reflective plate is arranged over the reflective cup on a side thereof that is distal from the tubular platform, with a reflective surface thereof optically facing the opening of the reflective cup. The first lighting unit is configured such that lights emitted from the first lighting lamp are able to, upon reaching the reflective surface of the reflective plate, get reflected outward to the surrounding environment. Herein optionally, the reflective surface of the reflective plate has a convex shape facing the opening of the reflective cup, and further optionally, the reflective surface of the reflective plate is configured to diffusingly reflect the lights emitted from the first lighting lamp.

According to some embodiments, the dynamic display apparatus can further include one or two second lighting units, each configured to provide lighting from one end of the tubular platform to the surrounding environment. Herein, each second lighting unit can include a second lighting lamp and a light diffuser. The second lighting lamp includes a plurality of lighting beads arranged in a ring surrounding the tubular platform; and the light diffuser is arranged over the second light lamp and surrounding the tubular platform, and is configured to diffusingly transmit lights emitted from the plurality of lighting beads of the second lighting lamp to thereby provide diffused lights to the surrounding environment. Herein optionally, the dynamic display apparatus further contains a first shade, which is arranged over the plurality of the light-emitting elements along a light emission direction thereof and configured to modulate lights emitted therefrom, and an outer surface of the first shade is configured to be reflective such that the diffused lights emitted from the second lighting units can be reflected by the outer surface of the first shade outward to the surrounding environment. Further optionally, the dynamic display apparatus can further include a second shade surrounding the first shade, and the second lighting lamp and the light diffuser of the second lighting unit can be arranged between the first shade and the second shade.

According to some embodiments, the dynamic display apparatus can further contain a sensor that is communicatively connected to the control unit and is configured to detect a command from a user by sensing any one of touching, shaking, or moving of the apparatus by the user. As such, the control unit is configured, upon detecting the command, to control a change of motion state mimicked by the simulation unit. Herein the sensor can be any one of an accelerometer, a gyroscopic sensor, a tactile sensor, a capacitive sensor, a piezoelectric sensor, or a combination thereof.

According to some embodiments, the dynamic display apparatus can further contain an antenna that is communicatively connected to the control unit and wirelessly coupled to a user terminal device. Herein, upon the antenna receiving an instruction from the user terminal device, the control unit is configured to control a change of motion state mimicked by the simulation unit.

According to some embodiments, the dynamic display apparatus can further contain a power source that is configured to provide power to the simulation unit and to the control unit. Herein optionally, the power source may comprise a battery, wherein the battery comprises a high-capacity battery, or a rechargeable battery.

In some embodiments, the power source may comprise a high-capacity battery, which can be at least one of a lithium battery, a lithium ion battery, or a hydrogen fuel cell.

In some other embodiments, the power source may comprise a rechargeable battery, and the dynamic display apparatus further comprises at least one of: (1) a first interface, which is electrically connected to the rechargeable battery and configured to allow the rechargeable battery to be recharged by electrically connecting an outside power outlet to the first interface; or (2) a solar panel, which is electrically connected to the rechargeable battery and configured to recharge the rechargeable battery using solar energy. Further optionally, a second interface that is electrically connected to the power source is further included in the dynamic display apparatus, and the second interface is configured to power another electronic device thereby.

In the following, one specific example is provided, which serves to illustrate the dynamic display apparatus as provided above.

Example 1

This example illustrates one specific embodiment of a dynamic display apparatus which is capable of mimically displaying the various motion states (e.g. flying tracks, stationary state, and flashing states) of fireflies. For the convenience of explanation, the dynamic display apparatus as illustrated in this specific embodiment is referred to as a "firefly lamp" hereinafter. It is to be noted that this example shall not be interpreted to impose any limitation to the scope of the dynamic display apparatus as provided in the disclosure.

Figure 2:
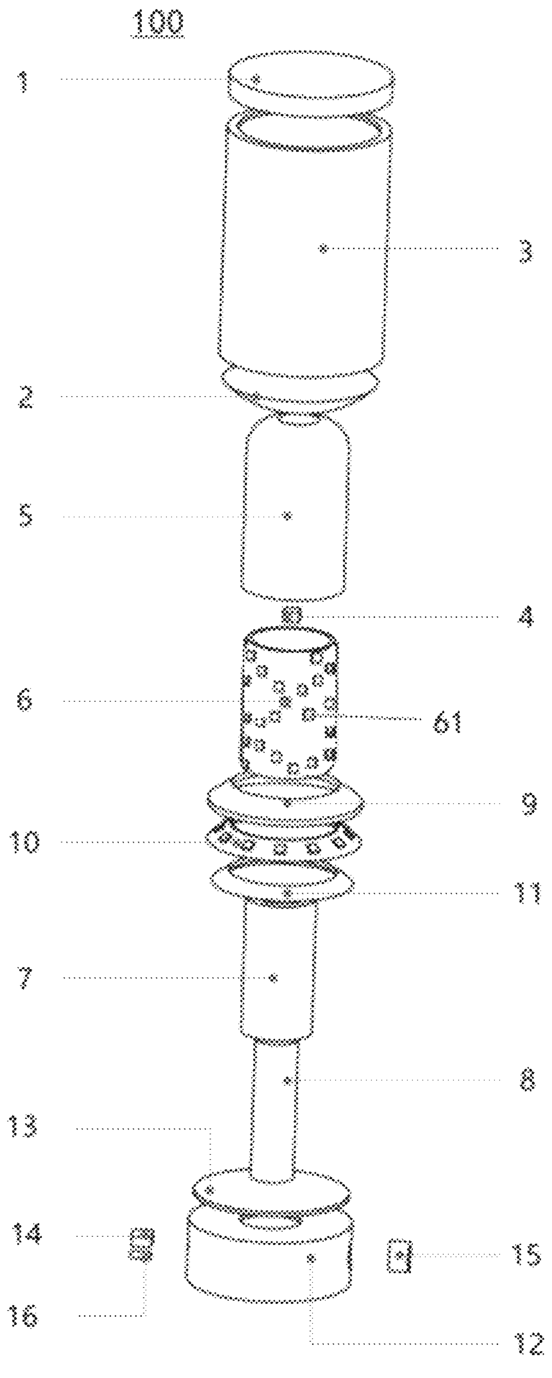
FIG. 2 shows an exploded view of the one embodiment of the dynamic display apparatus as shown in FIG. 1.

FIGS. 1 and 2 respectively show a schematic structure and an exploded view of the firefly lamp 100. As shown in FIG. 1 and FIG. 2, the firefly lamp 100 includes a base 12, a lamp body unit 50 (i.e. corresponding to the simulation unit in the dynamic display apparatus as described above) mounted on the base 12, and a control unit (corresponding to the control unit in the dynamic display apparatus as described above; not shown). The firefly lamp 100 further optionally includes an outer lampshade 3 (corresponding to the second shade in the dynamic display apparatus as described above), which is also mounted on the base 12, and is arranged over an outside of the lamp body unit 50 (i.e., the lamp body unit 50 is arranged inside the outer lampshade 3)

Herein the lamp body unit 50 includes an inner lampshade 5 (corresponding to the first shade in the dynamic display apparatus as described above) that is mounted on the base 12, and a flexible circuit board 6 (i.e. flexible printed circuit (FPC), corresponding to the platform in the dynamic display apparatus as described above) that is arranged inside the inner lampshade 5. Both the inner lampshade 5 and the flexible circuit board 6 take a cylindrical shape, so as to bring the convenience for fabrication and assembly. Each of the inner lampshade 5 and the flexible circuit board 6 can take another shape, which shall also be covered by the scope of the disclosure.

Figure 3:
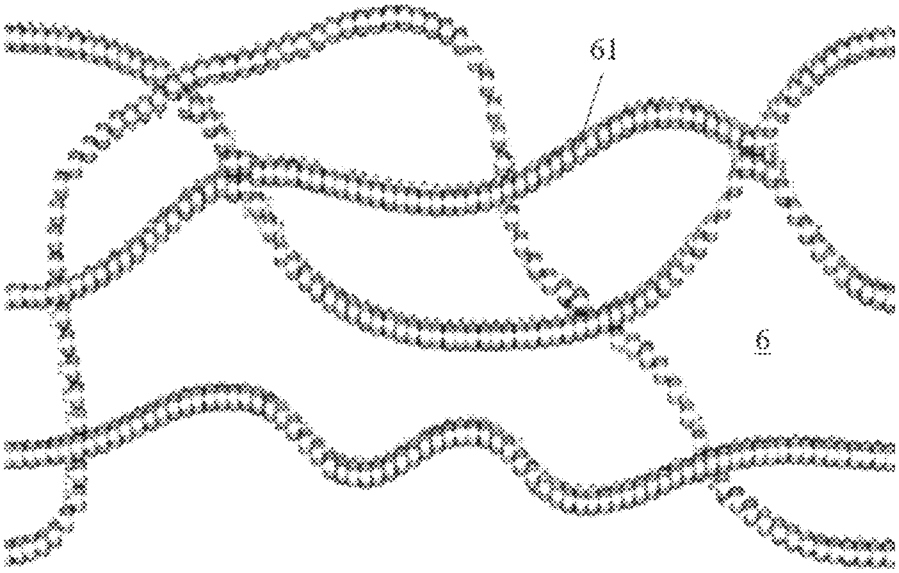
FIG. 3 shows one illustrating spatial arrangement of light-emitting elements (e.g. lamp beads) to form multiple simulated moving tracks on the flexible circuit board in certain embodiment of dynamic display apparatus.

A plurality of lamp beads 61 (corresponding to the plurality of light-emitting elements in the dynamic display apparatus as described above) are arranged on the outer surface of the flexible circuit board 6. These lamp beads 61 can be arranged so as to form one or more curves/tracks. FIG. 3 illustrates a flexible circuit board 6 in its extended mode and the lamp beads 61 arranged onto the flexible circuit board 6. As illustrated in FIG. 3, the lamp beads 61 form a total of four tracks (i.e. "simulated flying tracks") on the outer surface of the flexible circuit board 6. These tracks may be separated from one another, or may be intersected at certain points on the curves. Herein, each of the lamp beads 61 can be a light-emitting diode (LED) bead (e.g. surface-mounted device (SMD) LED bead.

The control unit is communicatively connected to the flexible circuit board 6, and thereby the control unit can control the ON/OFF state of the lamp beads 61 according to a control logic. As such, the firefly lamp 100 can display the various different motion states of one or more dotted objects (i.e. fireflies), so as to mimic or simulate the different motion states of the fireflies including flying, keeping still (i.e. maintaining stationary), and flashing, etc.

Specifically, the lamp beads 61 are arranged to form multiple different simulated flying tracks according to the flying tracks of fireflies. According to some embodiments, in the flying state, the control unit controls the ON/OFF state, the sequence (i.e. order) for the ON/OFF state, and/or the light intensity of different lamp beads 61, so that these lamp beads 61 are lighted up sequentially so as to allow the simulation of the lighting ON/OFF state and the flying state of one or more fireflies on each simulated flying track. In other words, by arranging the lamp beads 61 along a corresponding simulated flying track, and by further adjusting the time and intensity of the lamp beads 61 to turn on or off, the effects of a firefly flashing and smooth flying can be realized.

It is noted that when mimicking the flying state of fireflies, 1-2 lamp beads can be configured to be simultaneously turned on to simulate one firefly. For example, all the lamp beads on a simulated flying track can be sequentially numbered #1, #2, . . . , #n from the starting point to the ending point. When one single lamp bead is lighted up to mimic, it can be simply configured such that the n lamp beads are sequentially turned on and turned off from the starting point to the ending point, thereby simulating one firefly to fly along the flying track. When two lamp beads are lighted up to mimic, it can be configured such that lamp bead #1 gradually weakens and lamp bead #2 gradually lights up in the previous moment, then lamp bead #1 goes out, lamp bead #2 gradually weakens, lamp bead #3 gradually lights up, and so on.

Figure 4:
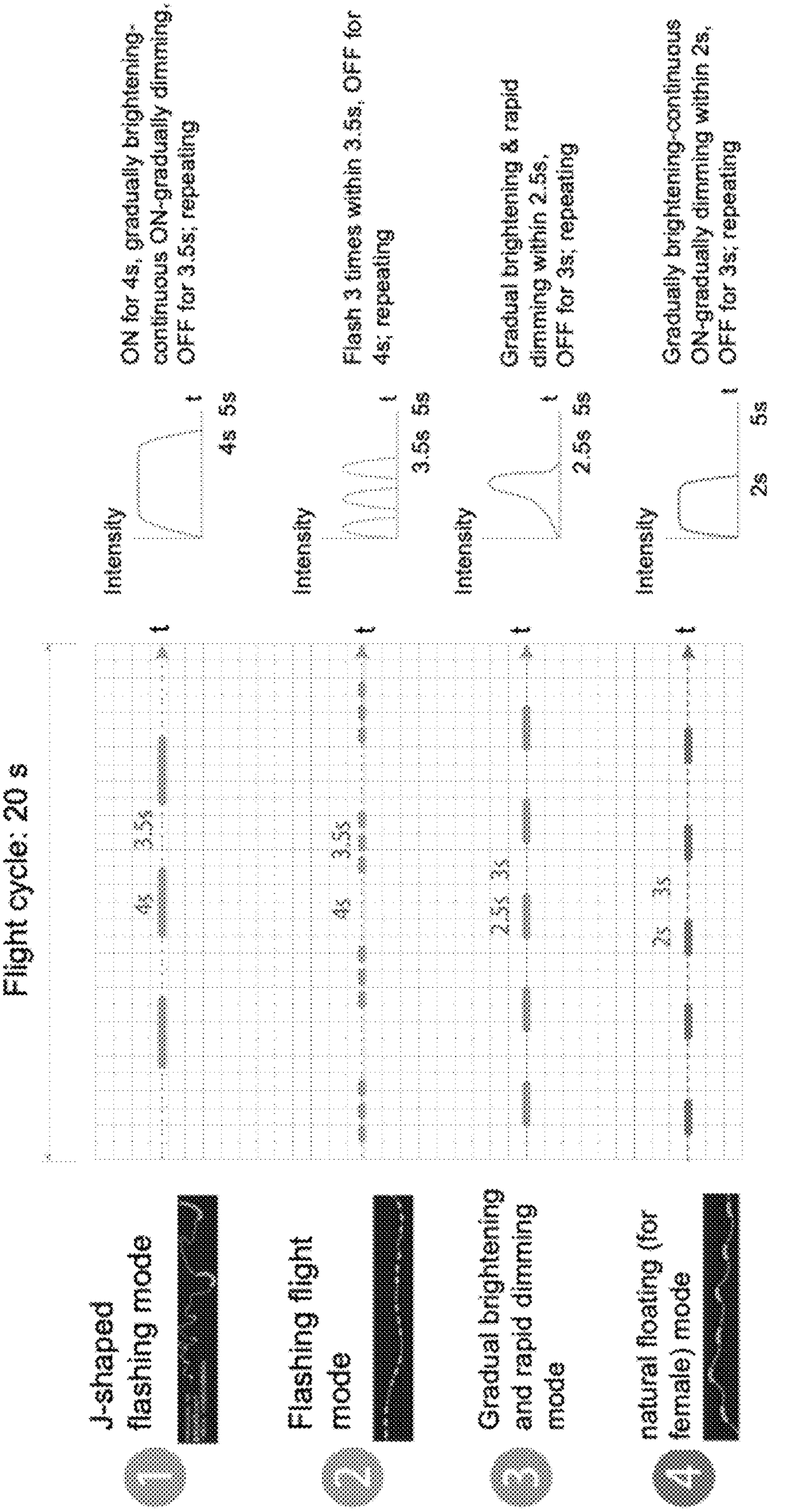
FIG. 4 is a schematic diagram of the control logic for controlling one single light-emitting element (e.g. lamp bead) so as to simulate the flying state of a firefly.

FIG. 4 is a schematic diagram of the control logic for controlling single lamp bead so as to simulate the flying state of a firefly. As shown, in the flying state, there are four types of lighting modes for one single lamp bead to mimic the flying state of a firefly, which include a J-shaped flashing mode, a flashing flight mode, a gradual brightening and rapid dimming mode, and a natural floating (for female) mode. The thick lines in FIG. 4 represent the flying stage of a firefly when flashing on, and the corresponding intensity-time (t) diagram represents the firefly brightness change pattern relative to time that is represented by each thick line.

According to some other embodiments, in the stationary state, the control unit controls the ON/OFF state, the ON/OFF time, and light intensity of one single lamp bead or several (n=2) adjacent lamp beads on the same simulated flying track to thereby simulate the in situ flashing effect of a firefly. In the stationary state, one or two lamp beads can be configured to simultaneously light up to thereby simulate the effects of a firefly. As such, when one single lamp bead is applied, the ON/OFF time and light intensity of the one single lamp bead can be adjusted to thereby simulate the in situ flashing effect of a firefly; or when two lamp beads are applied, the ON/OFF time and light intensity of two adjacent lamp beads along a same simulated flying track can be adjusted to thereby simulate the in situ flashing effect of a firefly.

Figure 5:
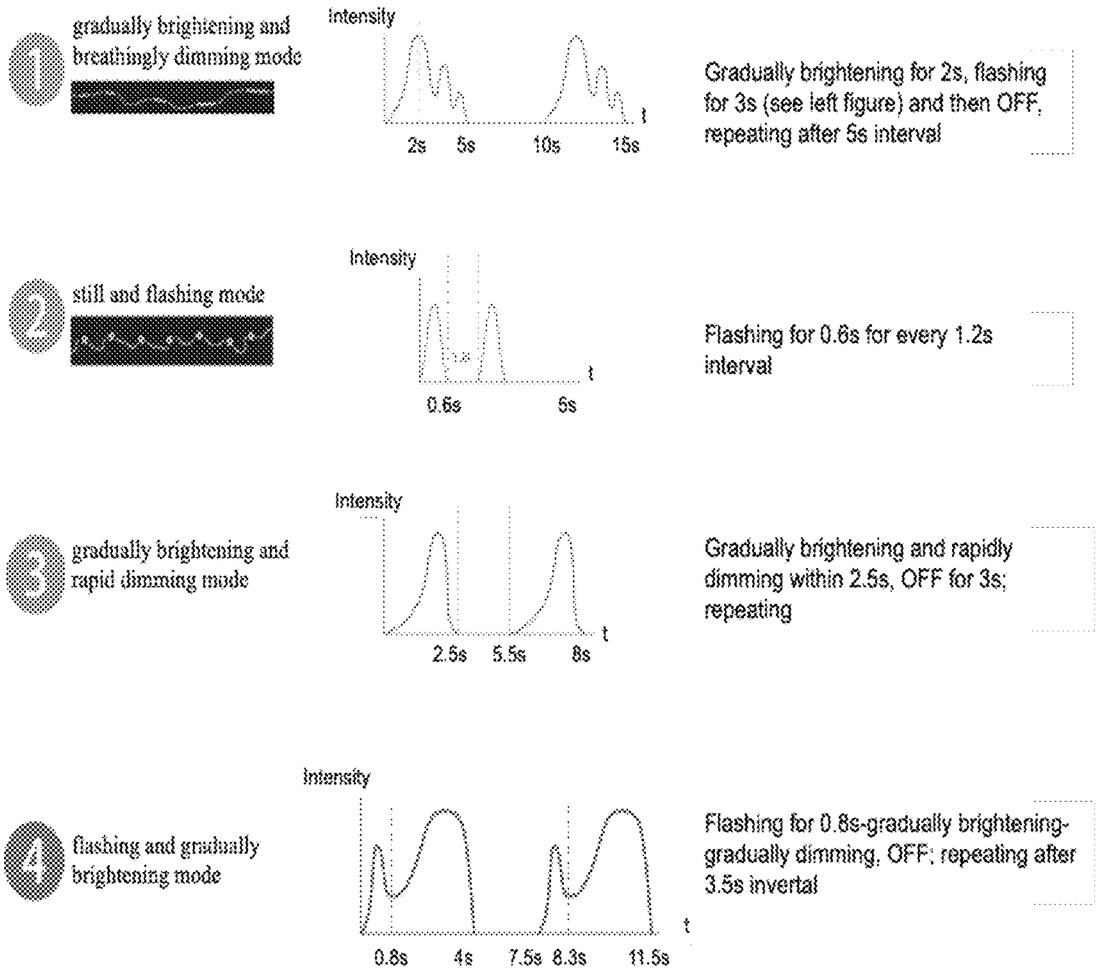
FIG. 5 is a schematic diagram of the control logic for controlling one single light-emitting element (e.g. lamp bead) so as to simulate the stationary state of a firefly.

FIG. 5 is a schematic diagram of the control logic for controlling single lamp bead so as to simulate the stationary state of a firefly. As shown, in the stationary state, there are four types of lighting modes for one single lamp bead to mimic the flying state of a firefly, which include a gradually brightening and breathingly dimming mode, a still and flashing mode, a gradual brightening and rapid dimming mode, and a flashing and gradually brightening mode. The corresponding intensity-time (t) diagram represents the brightness change pattern relative to time.

According to some embodiments, it can be controlled such that multiple lamp beads on each of the plurality of simulated flying tracks can be lighted on so as to simulate multiple (N>1) fireflies, and it can be further randomly controlled such that some of these multiple fireflies are in the flying state while others in the stationary in situ flashing state, thereby allowing the simulated fireflies can be seen from all angles of the firefly lamp.

Back to FIGS. 1 and 2, according to some embodiments, the outer lampshade 3 is configured to have a cylindrical shape and to have a composition of a transparent composition, thereby allowing the lights emitted from the lamp body unit 50 to be seen from an outside environment. The lower end of the outer lampshade 3 is mounted on the base 12. The upper end of the outer lampshade 3 is provided with an opening, which is detachably covered by a top cover 1.

The flexible circuit board 6 is mounted on the base 12 through an internal support 7. The internal support 7 preferably has a cylindrical shape, with a lower end thereof mounted on the base 12. The flexible circuit board 6 can be mounted on the internal support 7 by nestingly surrounding the internal support 7. As such, the outer lampshade 3, the inner lampshade 5, the flexible circuit board 6, and the internal support 7 can be configured to preferably have a cylindrical shape so as to bring convenience for fabrication and assembly.

In certain embodiments, the inner lampshade 5 is configured to be light-transmissible but opaque (translucent), thereby allowing the user (i.e. observer) to see the lights emitted from the lamp beads 61 on the flexible circuit board 6 therethrough, yet still preventing the user from seeing other components within the inner lampshade 5, such as the internal support 7.

The inner lampshade 5 can be made of a glass material or a resin material. Examples for a resin material include polyethylene (PE), polypropylene (PP), polystyrene (PS), polytetrafluoroethylene (PTFE), polyvinyl chloride (PVC), phenolic resin (PF), polycarbonate (PC), polyurethane (PU), polyamide (PA), or another transparent resin material. Preferably, the inner lampshade 5 can be made of PC, PVC, PS, PMMA, etc.

According to some embodiments, a light diffusing agent can be doped in the inner lampshade 5. The light diffusing agent can enhance the scattering and transmission of light passing through the inner lampshade 5 made of transparent resin, making the light emitted through the resin softer, thereby causing the inner lampshade 5 to become light-transmissible but opaque. Herein, examples for the light diffusing agent can include inorganic materials such as titanium dioxide, barium sulfate, calcium carbonate, silicon dioxide, or can include organic materials such as styrene and acrylic resin. Resin-based light diffusing agents are typically transparent or semi-transparent particles that allow most of the light to pass through, with little difference in refractive index between them and the substrate. After multiple refractions, the light passing through the substrate becomes bright and soft, with little impact on the material's transmittance. In some embodiments, the transmittance of the added light diffusing agent is about 75% or more, preferably about 85% or more, and more preferably about 90% or more. In other embodiments, the haze level of the added light diffusing agent is about 50-92%, for example, about 75-90%. In some embodiments, the weight percentage of the light diffusing agent in the substrate is about 0.1%-10%, preferably about 0.2%-5%. The thickness of the inner lampshade 5 is generally about 0.1-20 mm, for example, about 0.5-5 mm.

In one specific embodiment, the inner lampshade 5 is made of polycarbonate (PC) doped with titanium dioxide (i.e. the light diffusing agent, having a weight percentage of approximately 0.1%-3.5%. Herein, the thickness of the inner lampshade is approximately 0.1-5 mm. Preferably, the inner lampshade 5 can have a roughly a cylindrical shape. The composition used for the inner lampshade 5 enables the realization of the transformation from the dazzling lighting effects of the inner lamp beads to the flaring effects of fireflies. The inner lampshade 5 is light-transmissible and opaque, ensuring that the internal structure cannot be seen from the outside when there is no light inside.

According to some embodiments, the inner lampshade 5 is configured such that it only allows light to propagate from inside to outside. Therefore, users can observe the light emitted by the lamp beads 61 on the flexible circuit board 6 through the inner lampshade 5, but cannot observe other non-luminous components inside the inner lampshade 5. In this way, the inner lampshade 5 is light-transmissible and opaque. As such, the outer surface of the inner lampshade 5 can undergo light reflection treatment, for example, by adding a material to increase the reflection of light from the outside to the inside of the lampshade 5, or arranging a reflective film on the inner lampshade 5. In some embodiments, the outer surface of the inner lampshade 5 is coated with a reflective film, such as a film of metal (e.g. nickel, chromium, tin, gold, silver, etc.) or an alloy. By utilizing the reflection and absorption effect of the metal coating on light, the light emitted from the outside to the inside of the inner lampshade 5 can be reflected and absorbed. As such, users cannot observe other non-luminous components inside the inner lampshade 5, but they can still observe the light emitted by the lamp beads 61 on the flexible circuit board 6 through the inner lampshade 5. In one specific example, the outer surface of the inner lampshade 5 is treated with a vacuum plating process to form a coating of indium tin alloy, with a thickness of approximately 0.05-0.1 μm.

In the firefly lamp 100, the light emitted by a lamp bead 61 on the flexible circuit board 6 can form a spot on the inner lampshade 5, which is used to simulate a firefly. Generally it is desired that the light spot observed by the users has a specified size, such as being similar to the simulated point like object (i.e. firefly). According to some embodiments, controlling the size of the simulated dotted object can be achieved through one or more of the following settings: the size of a single lamp bead 61, the scattering degree of light emitted by the inner lampshade 5 on a single lamp bead 61, and the distance (or spacing) between the inner lampshade 5 and the flexible circuit board 6. Among them, the scattering degree formed by the inner lampshade 5 on the light emitted by a single lamp bead 61 refers to the degree of scattering caused by multiple refractions of light inside the material when it enters and passes through the inner lampshade, causing some of the light to deviate from the direction of incidence.

It is discovered that due to the scattering effect, the light emitted by a single lamp bead 61 on the inner lampshade 5 can be divided into a central part and a peripheral part based on the intensity of the light. The central part of the spot is mainly the light directly emitted by the lamp bead 61 through the inner lampshade 5, and also includes some light scattered at small angles (within about 45 degrees, such as 20 degrees). The peripheral part of the spot is mainly the light scattered by the lamp bead 61 after passing through the inner lampshade 5. The light intensity of the central part and the light intensity of the peripheral part of the spot are different. Among them, the light intensity of the central part of the spot is greater than that of the peripheral part, with a difference in intensity between 2-50 times. The pupil of a person changes with the intensity of ambient light. The stronger the ambient light, the smaller the pupil, and the less light it receives. The naked eye has a higher demand for the intensity of light that can be observed. The weaker the ambient light, the larger the pupils, the greater the amount of light received, and the lower the light intensity requirements for observable objects for the naked eye. Herein, the firefly lamp needs to be used in different ambient light conditions, and it is desired to maintain the size of the visible spot within a desired range. By experimenting, it is observed that under a brighter ambient light (such as outdoor daytime or indoor lighting), the size of the visible spot is mainly the central part of the spot, and the peripheral part of the spot is almost completely unobservable, whereas in a darker ambient light (such as outdoors at night or indoors with no lights on or weak lighting), the visible spot includes the surrounding parts of the spot. As a result, the size of the light spot observed in different environments varies, especially in darker ambient light, where the size of the light spot observed may exceed the desired size.

Herein according to some embodiments, the size of the simulated dotted objects is controlled by one or more of: (1) the size of each single lamp bead 61; (2) the scattering degree of light emitted by the inner lampshade 5 on a single lamp bead 61; and (3) the distance between the inner lampshade 5 and the lamp beads 61. For example, by adjusting the material of the inner lampshade 5 and the type and proportion of light diffusing agents added, the scattering of light emitted by the inner lampshade 5 against a single lamp bead 61 can be reduced, thereby reducing the area of the surrounding part of the light spot and achieving the goal of controlling the size of the light spot. As an alternative, the distance between the inner lampshade 5 and the lamp bead 61 can be reduced. For example, in one embodiment of the present invention, an SMD LED bead with an upper surface emitting area of approximately 0.5-5 mm×0.5-5 mm is used (such as a 2 mm×1.25 mm 0805 type LED bead). In this embodiment, the distance between the inner lampshade 5 and the lamp beads 61 can be about 0.1-5 mm, and preferably, the distance can be about 0.1-2 mm. Alternatively, by adjusting the material of the inner lampshade 5 and the type and proportion of light diffusing agents added, the difference in light intensity between the central and peripheral parts of the spot can be reduced, thereby adjusting the size of the central and peripheral parts of the spot to ensure that both are within an acceptable predetermined range.

According to some other embodiments, the size of the simulated dotted objects is controlled in a different manner. For example, the parameter (1), i.e. sizes of the plurality of light-emitting elements, can be adjusted by arranging a controllable shutter to each lamp bead 61 to thereby adjust the aperture of the light emitted therefrom; the parameter (2), i.e. the scattering degree of the inner lampshade 5, can be adjusted by means of liquid crystals and/or polarizer that can electrically module the scattering feature (e.g. by configuring the inner lampshade 5 to be a LCD screen); the parameter (3), i.e. the distance inner lampshade 5 and the lamp beads 61, can be adjusted by arranging a motor to one of the inner lampshade 5 or the flexible circuit board 6.

Preferably, lamp beads with a relatively small luminous angle may be used. For example, when using LED beads, the spotlight type LED beads can be chosen. Spotlight LED beads have high optical directivity, with a half value angle of about 5° ~20°, or smaller. Spotlight LED beads include LED beads packaged in cup shaped brackets (such as epoxy resin packaging), or LED beads packaged with metal reflective cavities, usually without scattering agents.

In the firefly lamp 100 provided herein, the light emitted by a lamp bead 61 on the flexible circuit board 6 can form a spot on the inner lampshade 5 to simulate fireflies. Generally it is desired that the light spot observed by the user has a movement speed and/or movement mode within a specified range, especially in continuous movement (i.e. non jumping movement). The movement speed of the light spot observed by the user should generally match the speed of fireflies. The observed movement speed of fireflies is not necessarily the actual flying speed of fireflies, but rather the movement speed observed at a certain distance or the object movement speed that is in line with the observer's preference (to suit different moods such as relaxation or activity). Preferably, the movement speed of the light spot observed by the user is expected to be around 1-100 mm/s, preferably around 5-50 mm/s.

Herein, the speed and/or mode of movement of the simulated dotted objects (i.e. fireflies) can be controlled by appropriately controlling the order and duration of the ON state of the lamp beads and/or the distance between adjacent light beads. The spacing between adjacent lamp beads should be as small as possible to avoid the adverse effect of jumping and moving due to the large spacing when adjacent lamp beads are turned on and turned off. In a specific embodiment, the distance (center to center distance) between adjacent LED beads on flexible circuit board 6 is about 0.5-5 mm, for example, about 1-3 mm.

As further illustrated in FIGS. 1 and 2, the firefly lamp 100 further comprises a first lighting unit and a second lighting unit (respectively corresponding to the first lighting unit and the second lighting unit in the dynamic display apparatus as described above). The first lighting unit is arranged on an upper part of the inner lampshade 5, and the second lighting unit is mounted on the base 12 and arranged between the outer lampshade 3 and the inner lampshade 5 along a radial direction. It is to be noted that the position of each the first and second lighting units can be optional. For example, the first lighting unit can be arranged on the base 12, and the second lighting unit can be arranged on the upper part of the inner lampshade 5.

In one embodiment, the first lighting unit comprises: a reflective cup 51 (correspond to the reflective cup of the first lighting unit in the dynamic display apparatus as described above), a top white light lamp 4 (correspond to the first lighting lamp of the first lighting unit in the dynamic display apparatus as described above), and a reflective plate 2 (correspond to the reflective plate of the first lighting unit in the dynamic display apparatus as described above). The reflective cup 51 is arranged in the middle of the upper end of the inner lampshade 5, and preferably has a trumpet shape with an opening thereof facing upwards. The top white light lamp 4 is arranged at the bottom of the reflective cup 51, and can comprise 1-10 white light lamps mounted on a PCB board. The reflective plate 2 is arranged at the inner top of the outer lampshade 3 and opposing to the top white light lamp 4. A distance is arranged between the top of the inner lampshade 5 and the top of outer lampshade 3. As shown in FIG. 5, the lower end surface of the reflective plate 2 has a reflective surface 21, configured such that the lights emitted from the top white light lamp 4 can, after hitting the reflective plate 2, get reflected outward to the surroundings by means of the reflective surface 21. The top white light lamp 4 is communicatively connected to the control unit, and the control unit can control the top white light lamp 4 to turn on or off.

Figure 6:
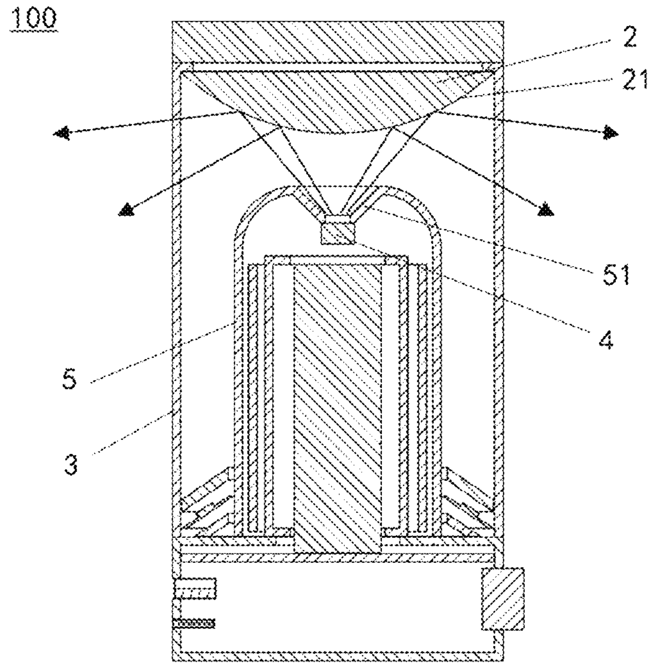
FIG. 6 schematically shows the reflection path of the light emitted by the first lighting unit.
Figure 7:
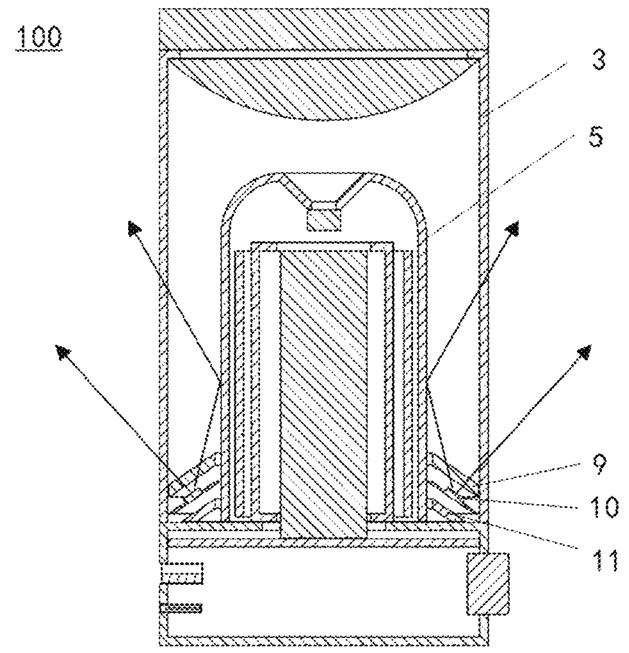
FIG. 7 schematically shows the reflection path of the light emitted by the second lighting unit.

As shown in FIG. 6, the lower end surface of the reflective plate 2 is configured to be a reflective surface 21. The top white light lamp 4 is thus combined with the reflective cup 51 to reflect lights onto the reflective plate 2, and further by means of the reflective surface 21, the lights can be reflected in all directions. The upper end surface of the reflective plate 2 is fixedly connected to the top of the outer lampshade 3. The reflective surface 21 of the reflective plate 2 comprises a spherical surface, and is coated with an electroplating film with a polished mirror surface. Preferably, the reflective plate 2 has a composition of PC/ABS, with its surface electroplated to have a polished mirror surface. ABS is a thermoplastic polymer having advantages of high strength, good toughness, and ease for processing and molding. By means of the reflective surface 21, the reflective plate 2 can reflect the lights emitted by the top white light lamp 4 outward to the surroundings, which can significantly increase the lighting range, and can also prevent glare and help reduce the light loss.

Herein, the second lighting unit comprises a bottom white light lamp 10 (corresponding to the second lighting lamp of the second lighting unit in the dynamic display apparatus as described above) and a light diffuser 9 (corresponding to the light diffuser of the second lighting unit in the dynamic display apparatus as described above). The bottom white light lamp 10 comprises a bottom FPC board of a circular cone shape, and a plurality of white light beads that are evenly distributed along the circumference of the bottom FPC board. The bottom FPC board comprises an inclined support that is inclined upwards and outward, and the white light beads are arranged on the inclined support. The light diffuser 9 is arranged over the bottom white light lamp 10, and is preferably arranged in parallel to the inclined support. The bottom FPC board and the light diffuser 9 are both provided with a through-hole configured for the inner lampshade 5 to pass through, such that the bottom white light lamp 10 and the light diffuser 9 are nestedly mounted on the inner lampshade 5 near the bottom thereof. As shown in FIG. 6, lights emitted by the bottom white light lamp 10 can, by means of the light diffuser 9 and the electroplating layer on the outer surface of the inner lampshade 5, get diffused to the surroundings, thereby further increasing the lighting range. The bottom white light lamp 10 is communicatively connected to the control unit, which can control the bottom white light lamp 10 to turn on or off.

In one embodiment, the bottom white light lamp 10 comprises a FPC board that harbors 8-20 white light beads and has a circular cone shape. The bottom white light lamp 10 and the electroplating layer on the outer surface of the inner lampshade 5 can cooperatively reduce the light loss significantly.

In one embodiment, the light diffuser 9 has a composition of silicone/PC doped with a light diffusing agent so as to evenly distribute lights, and have an anti-glare effect.

In one embodiment, the second lighting unit further comprises a heat-dissipating substrate 11, which is arranged at the lower end of the bottom white light lamp 10 and mounted on the base 12. The heat-dissipating substrate 11 preferably has a circular cone shape. The heat-dissipating substrate 11 can be made of aluminum, and can effectively dissipate the heat emitted from the bottom white light lamp 10.

In one embodiment, the base 12 has a cylindrical shape. The base 12 is equipped with a control switch 15, which is communicatively connected to the control unit. The control switch 15 is preferably arranged on the side wall of the base 12. By pressing the control switch 15, it is possible to switch between an ON/OFF mode, a top white light mode, a bottom white light mode, and a firefly mode. Under the OFF mode, the lamp body unit 50, the first lighting unit, and the second lighting unit are all in the OFF state. Under the top white light mode, only the first lighting unit is turned on. Under the bottom white light mode, only the second lighting unit is turned on. Under the firefly mode, only the lamp body unit 50 is in the ON state. In addition, under each of the bottom white light mode and the top white light mode, the brightness of the white light can be adjusted by rotating the control switch 15.

In one embodiment, the firefly lamp 100 further comprises a power supply 8 for supplying power, which is arranged inside the circular internal support 7. The power supply 8 is vertically arranged with its lower end fixedly mounted on the base 12. The power supply 8 is electrically connected, and configured to supply power, to the lamp body unit 50, the first lighting unit, and the second lighting unit.

In one embodiment, a printed circuit board 13 is arranged inside the base 12, and a gap is arranged between the printed circuit board 13 and the top plate of the base 12. The lower end of power supply 8 passes through the top plate of base 12 and is fixedly connected to printed circuit board 13. The base 12 is further provided with a first interface 16 for charging and a second interface 14 for external charging. Preferably, the first interface 16 comprises a Type-C interface, and the second interface 16 comprises a Type-A interface. Furthermore, the first interface 16 and the second interface 14 are separated along an axial direction, and both are arranged on the side wall opposing to the control switch 15.

In one embodiment that is not shown in the drawings, the firefly lamp 100 further comprises a gyroscope sensor and an acceleration sensor, and by means of these sensors, the tapping, picking up, and shaking of the firefly lamp 100 can, under the firefly mode, change the flight status of all fireflies.

The firefly lamp 100 provided in this disclosure can, by means of the lamp body unit 50, can mimic the flying and flashing effects of a firefly. By controlling the various flashing modes of the lamp beads in the lamp body unit 50, the firefly lamp 100 can further realize the flashing effects under different scenarios, thereby effectively ensuring the vividness of the simulated firefly effects. At the same time, the inner lampshade 5 comprises polycarbonate (PC) doped with a light diffusing agent, which enables the realization of the transformation from the dazzling lighting effects of the inner lamp beads to the flaring effects of fireflies, thereby further enhancing the vividness of the simulated firefly effects. In addition, through the first and second lighting units, the firefly lamp 100 can significantly increase the lighting range. The firefly lamp 100 has a simple structure and a small size, and is easy to carry, control and operate.

The present disclosure further provides a method for displaying the motion states of simulated objects using a lamp, including: providing a lamp, which comprises a simulation unit and a control unit. The simulation unit comprises a flexible circuit board, and a plurality of lamp beads are arranged on the outer surface of the flexible circuit board. Under control of the control unit, the ON/OFF state of the lamp beads can be controlled to thereby display the motion state of the simulated object. The object can be a flame, and its motion states can include changes in the range and brightness of the emitted light. The object can also be an animal or a plant, such as a firefly, whose motion states can include flying, stillness, brightness changes of the emitted lights (flickering or flashing), etc. The lamp beads can be arranged according to the moving tracks of the object to form multiple different simulated moving tracks. In the moving state, the control unit controls the ON/OFF state, ON/OFF order, and/or light intensity of each of a subset of the plurality of lamp beads on one of the multiple simulated moving tracks, so that the emitted lights of the lamp beads moves or remains stationary based on the corresponding simulated moving track, thereby simulating the moving state of the object.

In the stationary state, the control unit controls the ON/OFF state and intensity of the lamp beads to thereby simulate the in situ flashing effect of the object. Specifically, the control unit controls the ON/OFF state, ON/OFF time, and/or light intensity of one single lamp bead or two adjacent lamp beads on one of the multiple different simulated moving tracks to thereby simulate the object.

Herein, the lamps used in this method can also be the lamps for mimically displaying the motion states of an object according to the present invention.

It is to be noted that in the description of the present invention, the terms "first" and "second" are only used for descriptive purposes and are not to be understood as indicating or implying relative importance or implying the number of the technical features.

Therefore, features limited to "first" and "second" can explicitly or implicitly include one or more of these features. In the description of the present invention, "multiple" or "plurality" means two or more, unless otherwise specifically defined.

In the present disclosure, unless otherwise explicitly defined and limited, the terms "mount", "install", "connect", "couple", "fix", and other similar terms, should be broadly understood. For example, it can be a fixed connection, a detachable connection, or an integrated connection. It can be a mechanical connection or an electrical connection. It can be directly connected, indirectly connected through an intermediate medium, or can be an internal connection between two components. For ordinary technical personnel in this field, the specific meanings of the above terms in the present disclosure can be understood based on specific circumstances.

In addition, in the description of this specification, the reference to terms such as "one embodiment", "some embodiments", "examples", "specific examples", or "some examples" means that the specific features, structures, materials, or features described in conjunction with the embodiment or example, are included in at least one embodiment or example of the present disclosure. In this specification, the schematic expressions of the above terms do not necessarily refer to the same embodiments or examples. Moreover, the specific features, structures, materials, or features described can be combined in an appropriate manner in any one or more embodiments or examples.

Finally, it should be noted that the above is only a preferred embodiment of the present disclosure and does not constitute any limitation on the present disclosure. Although the present disclosure has been described in detail with reference to the aforementioned implementation scheme, it is still possible for those skilled in the art to make modifications to the technical scheme recorded in the aforementioned embodiment or to equivalently replace some of its technical features. Any modifications, equivalent substitutions, improvements, etc. made within the spirit and principles of this disclosure shall be included within the scope of protection of this disclosure.

The invention claimed is:

1. A dynamic display apparatus capable of mimically displaying at least one motion state of one or more objects, comprising a simulation unit and a control unit, wherein:

the simulation unit comprises a platform and a plurality of light-emitting elements, wherein the plurality of light-emitting elements are spatially arranged on the platform to thereby form one or more simulated moving tracks of the one or more objects, wherein the platform comprises a tubular platform, wherein the plurality of the light-emitting elements are mounted on part or all of an outer surface of the platform with a light-emission direction thereof outward to a surrounding environment:

the control unit is communicatively coupled to the plurality of light-emitting elements, and controls at least one of an ON/OFF state, an ON/OFF frequency, an ON/OFF duration, or a light intensity of each of the plurality of light-emitting elements such that lights emitted therefrom compositely mimic the at least one motion state of the one or more objects:

wherein the dynamic display apparatus further comprises a first shade, arranged over the plurality of the light-emitting elements along a light emission direction thereof and configured to modulate lights emitted therefrom, wherein the first shade is configured to be light-transmissible and opaque, wherein the first shade comprises a transparent composition doped with a light diffusing agent.

2. The dynamic display apparatus of claim 1, wherein at least one of: (1) sizes of the plurality of light-emitting elements; (2) a scattering degree of the first shade; or (3) a distance between the plurality of the light-emitting elements and the first shade is adjusted so as to realize that the one or more objects to be mimicked have a prescribed size.

3. The dynamic display apparatus of claim 1, wherein lights emitted by each light-emitting element form on the first shade a luminous spot that comprises a central part and a peripheral part, wherein:

the first shade is configured such that the central part and the peripheral part have a reduced difference in brightness.

4. The dynamic display apparatus of claim 1, wherein each of the plurality of the light-emitting elements comprises a light-emitting diode (LED) bead.

5. The dynamic display apparatus of claim 1, wherein the platform comprises a flexible circuit board, wherein the plurality of the light-emitting elements are electrically mounted onto the flexible circuit board.

6. The dynamic display apparatus of claim 1, wherein each of the plurality of light-emitting elements comprises at least two of a red light-emitting sub-element, a green light-emitting sub-element, or a blue light-emitting sub-element, and the control unit further controls a color scheme of each of the plurality of light-emitting elements, wherein the color scheme includes at least two of a red light, a green light, or a blue light, or a combination thereof.

7. The dynamic display apparatus of claim 1, wherein the one or more objects comprise at least one firefly, the at least one motion state comprises a flying state and/or a stationary state of the at least one firefly, and the plurality of light-emitting elements are spatially arranged to thereby form one or more simulated flying tracks of the at least one firefly.

8. The dynamic display apparatus of claim 1, wherein the one or more objects comprise a plurality of microscopic particles, the at least one motion state comprises a Brownian movement of the plurality of microscopic particles, and the plurality of light-emitting elements are spatially arranged to thereby form a plurality of simulated moving tracks of the plurality of microscopic particles.

9. The dynamic display apparatus of claim 1, wherein the at least one motion state comprises a moving state, wherein the control unit controls a subset of the plurality of light-emitting elements corresponding to one of the one or more simulated moving tracks according to a control logic such that lights emitted therefrom compositely mimic the moving state of one of the one or more objects moving on the one of the one or more simulated moving tracks.

10. The dynamic display apparatus of claim 9, wherein the control logic controls at least one of a sequence, a frequency, or a duration of an ON state of each of the subset of the plurality of light-emitting elements; or a distance between two neighboring light-emitting elements that are at an ON state, so as to control a speed and/or a manner of the one of the one or more objects moving on the one of the one or more simulated moving tracks.

11. The dynamic display apparatus of claim 1, wherein the at least one motion state comprises a stationary state, wherein the control unit is configured to be able to control one or more of the plurality of light-emitting elements such that lights emitted therefrom mimically display at least one of a constantly lit lighting effect or an in situ flashing effect of each of a subset of the one or more objects.

12. A dynamic display apparatus capable of mimically displaying at least one motion state of one or more objects, comprising a simulation unit and a control unit, wherein:

the simulation unit comprises a platform and a plurality of light-emitting elements, wherein the plurality of light-emitting elements are spatially arranged on the platform to thereby form one or more simulated moving tracks of the one or more objects, wherein the platform comprises a tubular platform, wherein the plurality of the light-emitting elements are mounted on part or all of an outer surface of the platform with a light-emission direction thereof outward to a surrounding environment:

the control unit is communicatively coupled to the plurality of light-emitting elements, and controls at least one of an ON/OFF state, an ON/OFF frequency, an ON/OFF duration, or a light intensity of each of the plurality of light-emitting elements such that lights emitted therefrom compositely mimic the at least one motion state of the one or more objects;

wherein the dynamic display apparatus further comprises one or two first lighting units, each configured to provide lighting from one end of the tubular platform of the simulation unit to the surrounding environment and comprising:

a reflective cup, arranged over the one end of the tubular platform with an opening thereof facing outwards away from the one end of the tubular platform;

a first lighting lamp, arranged at a bottom of the reflective cup; and a reflective plate, arranged over the reflective cup on a side thereof that is distal from the tubular platform, with a reflective surface thereof optically facing the opening of the reflective cup;

wherein:

lights emitted from the first lighting lamp are able to, upon reaching the reflective surface of the reflective plate, get reflected outward to the surrounding environment.

13. The dynamic display apparatus of claim 12, wherein the reflective surface of the reflective plate has a convex shape facing the opening of the reflective cup, and the reflective surface of the reflective plate is configured to diffusingly reflect the lights emitted from the first lighting lamp.

14. A dynamic display apparatus capable of mimically displaying at least one motion state of one or more objects, comprising a simulation unit and a control unit, wherein:

the simulation unit comprises a platform and a plurality of light-emitting elements, wherein the plurality of light-emitting elements are spatially arranged on the platform to thereby form one or more simulated moving tracks of the one or more objects, wherein the platform comprises a tubular platform, wherein the plurality of the light-emitting elements are mounted on part or all of an outer surface of the platform with a light-emission direction thereof outward to a surrounding environment:

the control unit is communicatively coupled to the plurality of light-emitting elements, and controls at least one of an ON/OFF state, an ON/OFF frequency, an ON/OFF duration, or a light intensity of each of the plurality of light-emitting elements such that lights emitted therefrom compositely mimic the at least one motion state of the one or more objects:

wherein the dynamic display apparatus, further comprises one or two second lighting units, each configured to provide lighting from one end of the tubular platform to the surrounding environment and comprising:

a second lighting lamp, comprising a plurality of lighting beads arranged in a ring surrounding the tubular platform;

a light diffuser, arranged over the second light lamp and surrounding the tubular platform, configured to diffusingly transmit lights emitted from the plurality of lighting beads of the second lighting lamp to thereby provide diffused lights to the surrounding environment.

15. The dynamic display apparatus of claim 14, further comprising a first shade, arranged over the plurality of the light-emitting elements along a light emission direction thereof and configured to modulate lights emitted therefrom, wherein an outer surface of the first shade is configured to be reflective such that the diffused lights emitted from the second lighting units can be reflected by the outer surface of the first shade outward to the surrounding environment.

16. The dynamic display apparatus of claim 15, further comprising a second shade surrounding the first shade, wherein the second lighting lamp and the light diffuser of the second lighting unit are arranged between the first shade and the second shade.

* * * * *